United States Patent [19]
Knepler et al.

[11] Patent Number: 5,186,399
[45] Date of Patent: Feb. 16, 1993

[54] DIGITAL CONTROL SYSTEM FOR A COFFEE GRINDER AND ASSOCIATED COFFEE BREWER

[75] Inventors: John T. Knepler, Chatham; Cloyce Newton, Divernon; Kenneth W. Stover, Springfield, all of Ill.

[73] Assignee: Bunn-O-Matic Corporation, Springfield, Ill.

[21] Appl. No.: 622,171

[22] Filed: Dec. 4, 1990

Related U.S. Application Data

[60] Continuation of Ser. No. 447,161, Dec. 7, 1989, abandoned, which is a division of Ser. No. 226,675, Aug. 1, 1988, abandoned.

[51] Int. Cl.$^5$ .............................................. B02C 25/00
[52] U.S. Cl. ........................................ 241/34; 99/286; 241/36
[58] Field of Search ............................ 241/33, 34, 36; 366/601; 99/280, 286, 289 R

[56] References Cited

U.S. PATENT DOCUMENTS

4,406,217 9/1983 Oota ....................................... 99/280
4,789,106 12/1988 Weber ............................... 241/101.2

Primary Examiner—Joseph M. Gorski
Attorney, Agent, or Firm—Trexler, Bushnell, Giangiorgi & Blackstone, Ltd.

[57] ABSTRACT

A digital control system for a coffee bean grinder, particularly one with a dual hopper, which is conveniently programmable and automatically operable for selecting bean type and grinding with a high degree of accuracy bean quantities ranging from a few ounces (e.g., 3 ounces or less) for brewing a few cups of coffee, to large quantities (e.g., 2 pounds or more) for brewing several gallons of coffee. The invention may be confined entirely to a grinder, or may be incorporated in a brewing system consisting of a brewer and one or more grinder. The invention allows one grinder to accommodate one or more coffee grinders either of the same type or of different types (i.e., a brewer for making multi-cup quantities or urns for making gallon quantities).

3 Claims, 7 Drawing Sheets

DIGITAL CONTROL SYSTEM FOR A COFFEE GRINDER AND ASSOCIATED COFFEE BREWER

This application is a continuation of application Ser. No. 447,171, filed Dec. 7, 1989, and now abandoned, which is a divisional of application Ser. No. 226,675, filed Aug. 1, 1988, and now abandoned.

BACKGROUND OF THE INVENTION

This invention relates generally to new and improved means for programming and operating coffee bean grinders More particularly it relates to such means whereby the same grinder unit may be used to select and grind different types of beans in accurate predetermined quantities ranging from a few ounces (e.g., 2 ounces) up to several pounds (e.g., 3 pounds). Thus, when a grinder is equipped with the novel programming and operating means of this invention it may be used to serve one or more coffee brewers of either the same or different types (e.g., multi-cup quantity brewers or multi-gallon urn brewers)

In recent years it has become increasingly popular for restaurants and institutions to serve fresh brewed coffee from "fresh-ground" coffee beans This has created an increasing demand for coffee bean grinders having a high degree of versatility so as to be readily adaptable to a variety of different coffee making situations wherein not only the quantity of beans to be ground but also the type of coffee beans (e.g., "regular" beans and "decafe" beans) to be ground must be accommodated Coffee bean grinders are commercially available which permit ready selection between two different types of beans, and selection between fractional and full batch quantities within a relatively narrow range of bean quantities. However, these commercial grinders cannot accurately accommodate wide ranges in quantities such as between a few ounces of ground coffee (e.g., 2 or more ounces) and multi-pound quantities. Thus, the same grinder was not adaptable to serve both coffee makers of the type used to brew coffee in multi-cup quantities (e.g., 5-10 cups) and in gallon quantities (e.g., 1-3 gallons) These prior grinders utilized electromechanical timers which provided adequate accuracy over a relatively narrow range in the order of several ounces (e.g., 2 to 5 ounces) but not over a wide range in the order of several ounces up to several pounds.

From a number of standpoints it is desirable to make available a basically "standard" coffee bean grinder with sufficient versatility so as to meet the needs of a small user such as a small restaurant or diner, or a large user such as large combination restaurant and banquet hall Such a standard unit can be mass-produced, thereby reducing the original cost as well as the cost of spare parts. Furthermore, a standard unit tends to reduce the cost of servicing while increasing the availability of experienced service personnel.

The grinding mechanisms, motor drives and hopper changing mechanisms in commercially available coffee bean grinders have adequate built-in versatility to meet existing needs. However, the programming and control components of the commercially available grinders do not have adequate versatility and flexibility. Hence, the object of the invention, generally stated, is the provision of economically available coffee bean grinders which incorporate new and improved programming and control means which impart substantially greater versatility so as to meet a wide spectrum of user needs and requirements.

More specifically, the object of the invention is to provide coffee bean grinders having a microprocessor board, a 3-digit digital readout board and suitable switching whereby the grinders will have one or more of the following new and improved programming and control features:

1. In one operating mode have a grind cycle deviation programmable in one-tenth second increments from 0.4 second to 99.9 seconds, and in a second operating mode have a grind cycle duration programmable in seconds from 100 to 999 seconds;
2. Retain existing program settings in the event of power loss due to outage or unplugging;
3. Have on-demand recall of program settings by use of a memory device;
4. Have multiple settings for each bean hopper;
5. Be operable by actuating three switches; one for hopper selection, one for grind cycle programming and one for initiating the grind cycle;
6. Be capable of coordinating the output of two or more grinders from one coffee brewer;
7. Be programmable by manipulating three switches, one to turn on a readout display, one to scan the display upward and one to scan the display downward;
8. Provide automatic blanking of display LEDs after a predetermined period of non-use.

SUMMARY OF THE INVENTION

The invention is directed, in combination with a coffee bean grinder having a bean grinding mechanism, an electric motor operably connected in driving relationship with said grinding mechanism, dual bean hoppers mounted in gravity feed relationship with said grinding mechanism, and gate means interposed between said hoppers and said grinding mechanism and operable to connect a selected one of said hoppers in gravity feeding relationship with said grinding mechanism, to grinder programming and control means comprising a microprocessor and digital display means operably interconnected with the microprocessor by circuit means. The programming and control means include three operator control switches, one functioning to condition the gate means to place one of the hoppers in communication with the grinding mechanism, a second functioning to select a grinding time, and a third functioning as a start switch.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
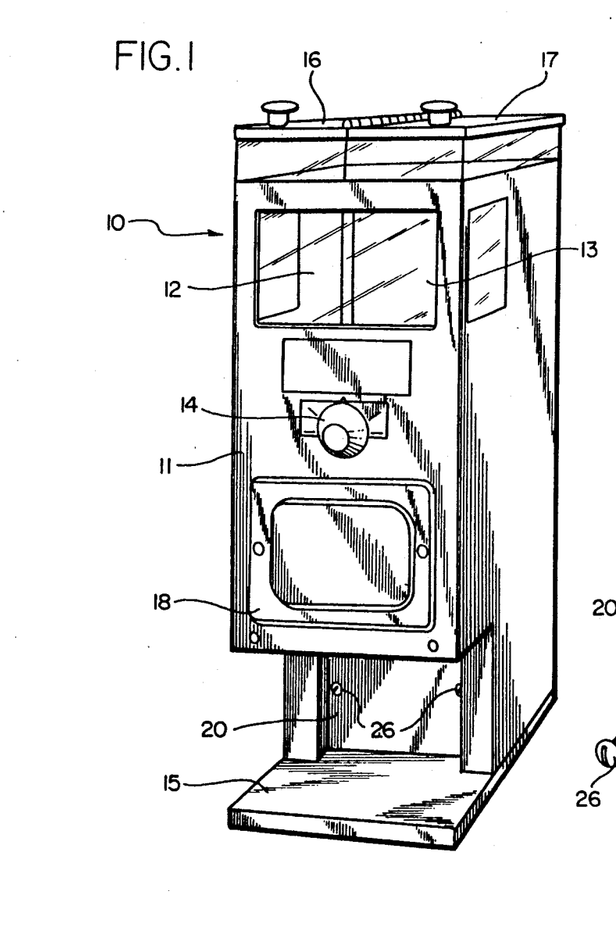
FIG. 1 is a side and top perspective view of a coffee grinder in which one embodiment of the invention is incorporated.

Referring to the Figures, and particularly to FIG. 1, a dual-hopper grinder 10 is seen to include generally a housing 11 within which a first hopper 12 and a second hopper 13 are provided for receiving respective quantities of two different types of coffee beans for grinding A solenoid-controlled shutter assembly (not shown) allow beans to gravity feed from a selected one of the hoppers to a motor-driven grinder (now shown) within housing 11, which grinds beans from the selected hopper following user-actuation of a grinder control switch 14. The ground beans are collected in a brew funnel (not shown) positioned on a base portion 15 of the housing.

Separate hinged covers 16 and 17 may be provided for filling the hoppers, which each typically hold up to six pounds of beans. A removable cover 18 may be provided to facilitate access to the grinder mechanism for cleaning or repair.

The construction and operation of grinder 10 are described in U.S. Pat. No. 4,607,200, entitled "Coffee Maker", which issued to John D. Zimmerman on Aug. 19, 1986, and in application Ser. No. 061,724, filed June 15, 1987, of Charles A. Nidiffer, entitled "Dual Hopper Coffee Maker", both of which are assigned to the same assignee as the present application.

Figure 2:
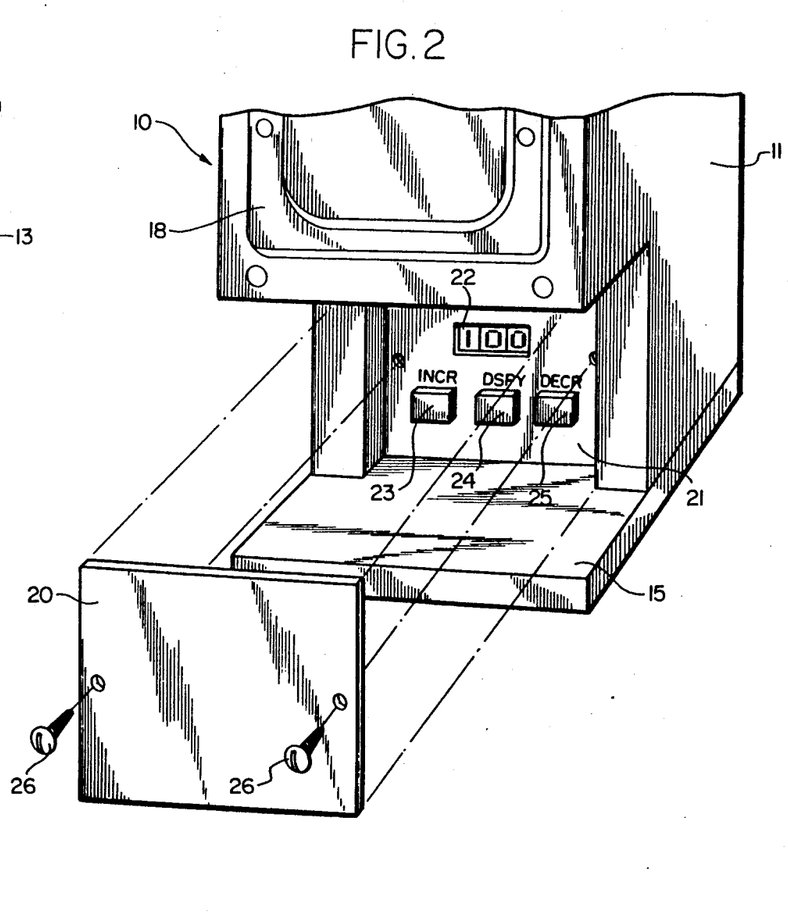
FIG. 2 is an enlarged perspective view of a portion of the coffee grinder of FIG. 1 with the timer control panel access cover removed to show the timer set-up panel thereof.

In accordance with the invention, grinder 10 includes a control system which enables the grinder to grind precise quantities of coffee over a wide range of grind cycle lengths. In particular, as shown in FIG. 2, housing 11 includes a removable cover plate 20 which provides access to a control panel 21. The control panel includes a three digit display 22 of the grind cycle duration, and a set of three push button controls 23, 24 and 25, which provide grind cycle increase, display and decrease functions, respectively, when actuated. A pair of machine screws 26 secure panel 20 over the display and switches during normal use of the grinder.

The controls of panel 21 provide in conjunction with grinder control switch 14 a convenient and precise means of controlling grinder operation. Display window 22 illuminates upon actuation of any one or more of push-button switches 23-25 to indicate the duration of the grind cycle. For cycles less than 99.9 seconds, the last is a tenths digit. For cycles of 100 seconds or greater, time is indicated in seconds. The display stays illuminated for a fixed period of time following a control actuation, and then automatically extinguishes to prolong indicator life.

Figure 3:
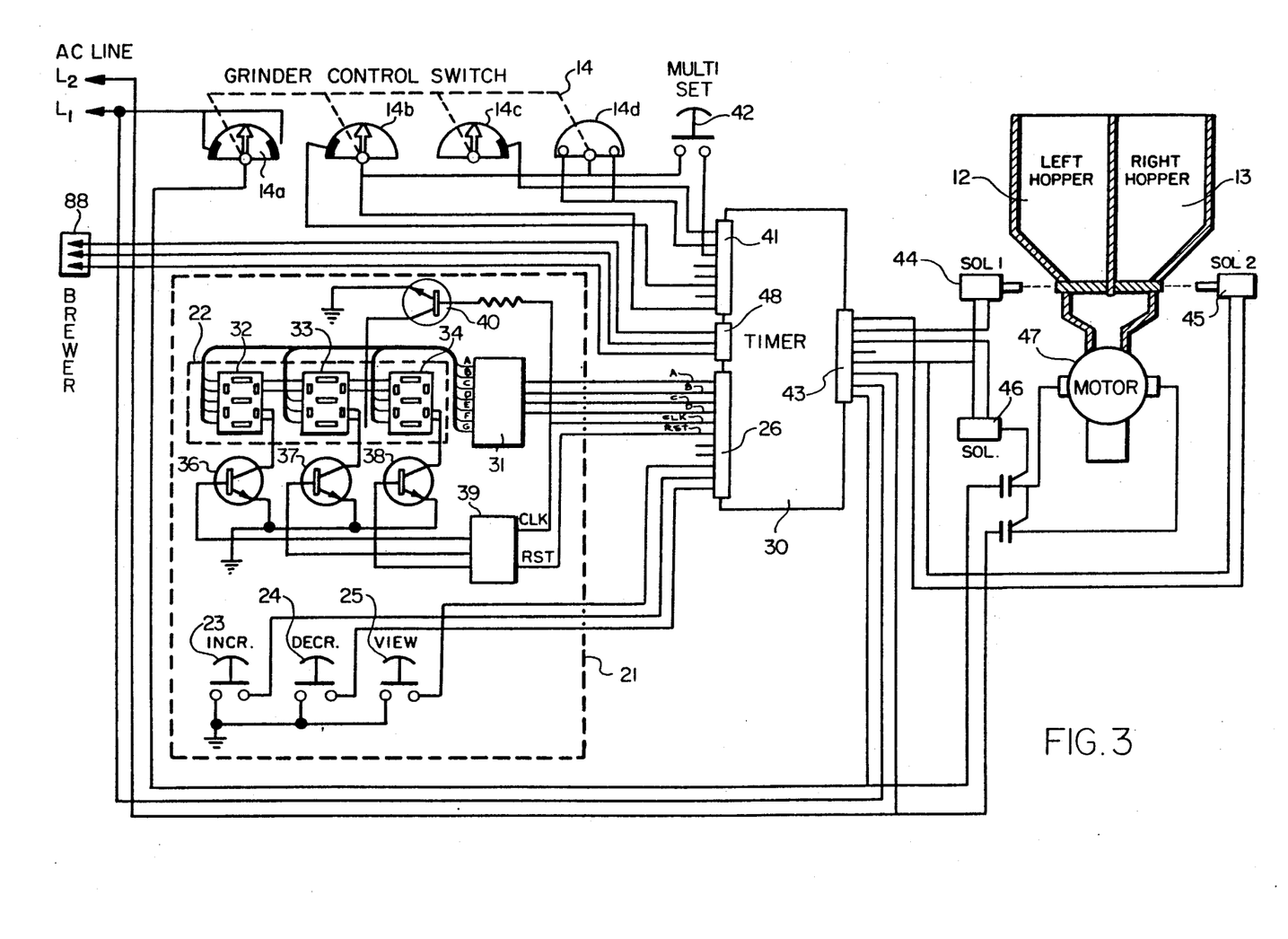
FIG. 3 is a simplified electrical schematic diagram of the coffee grinder.

Referring to FIG. 3, within grinder 10 push button switches 23-25 are connected through a connector 26 to a timer module 30. This module provides output signals A-D at the same connector which are converted to display control signals by a display driver 31. The display control signals are applied to three seven-segment display devices 32-34 which form the grind cycle duration display 22. In accordance with conventional practice, the applied control signals and the display devices are driven by strobe pulses to reduce wiring complexity. Transistors 36-38 and a pulse-driven sequence counter 39 sequence the display devices. A transistor 40 separately controls the decimal point segment of display device 33.

Additional control inputs are provided to timer module 30 from the four switch sections 14a-14d of grinder control switch 14 through a second connector 41. When switch 14 is set for grinding beans in the left hopper, switch section 14b applies an appropriate hopper selection signal to the module. When the grinding cycle is initiated, switch section 14d applies a start signal to the module. Similarly, when the right hopper is selected switch section 14c provides a hopper selection signal, and switch section 14d provides a start signal as before. Switch segment 14a provides power to grinder 10 only when one or the other of the hoppers is selected. Selection of an alternate grind cycle for each hopper is possible by momentarily actuating push-button switch 42.

Timer module 30 provides output signals through a third connector 43 which actuates either solenoid 44 or solenoid 45 to select the desired hopper. In addition, a control signal is provided to a relay 46, which controls the application of AC line current to the grinder motor 47.

To set the grinder cycle the user removes cover plate 20 and presses either increase or decrease push buttons 23 and 25 while observing the grind cycle duration in seconds (or tenths of seconds) displayed on display 22. When the correct duration is set, cover 20 is replaced and a brew funnel is inserted under the grinder mechanism. Control switch 14 is then rotated, counter-clockwise for the left hopper, clockwise for the right hopper, momentarily into its spring loaded start position, to initiate the grinding cycle for the selected hopper. Once the grinding cycle has begun the switch is released from the start position and left in the run position pending completion of the cycle.

The output signals provided by module 30 first actuate the appropriate one of solenoids 44 and 45 to select the hopper, and then actuate relay 46 to operate grinder motor 47. The hopper remains open for the precise grind cycle selected, after which the selected hopper closes. The grinder motor continues to be powered for a short predetermined period of time, typically in the order of 20 seconds, to clear bean residue from the grinder. When the grinding cycle has been completed, switch 14 is returned to its center off position.

The duration of the grinding cycle is set by the user to obtain a precise quantity of ground beans for a reference brewing volume. In accordance with a further aspect of the invention, where less than a full reference quantity is to be brewed, timer module 30 may be conditioned through a fourth connector 48 to provide a lesser ground bean quantity. In particular, for ½ and ¾ partial brews timer module 30 automatically adjusts the operating cycle of motor 47 to supply an appropriate quantity of ground beans to the brewer. The quantity so supplied may be, but is not necessarily, proportional to the reduction in brew volume.

Figure 4:
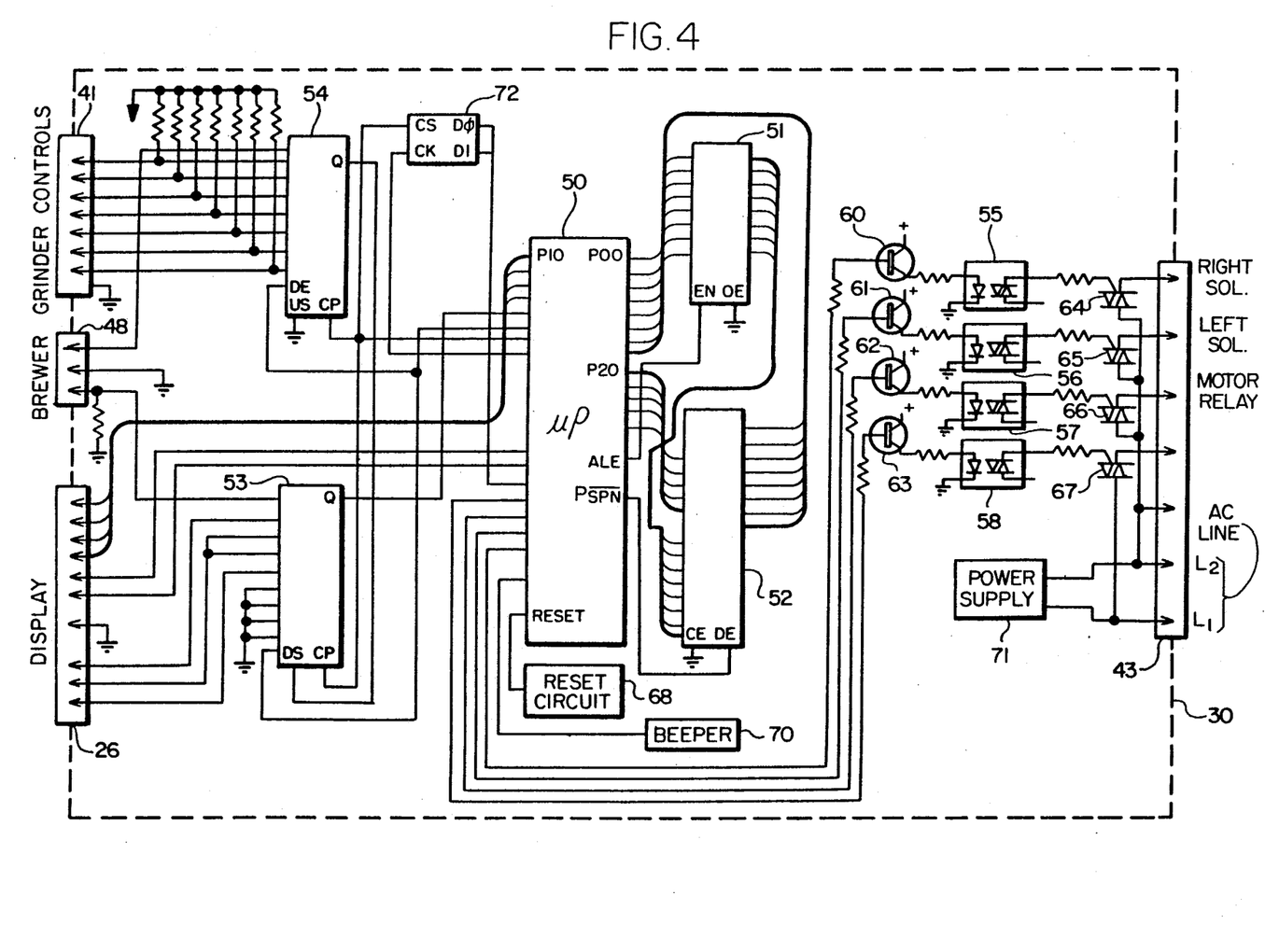
FIG. 4 is a simplified electrical schematic diagram of the timer module of the coffee grinder.

Referring to FIG. 4, timer module 30 may comprise a conventional microprocessor 50, such as the Intel 8051 series, in association with a latch 51 and an EPROM 52. Control signals developed by switches 23-25 are buffered in a conventional parallel-in serial-out data buffer 53 prior to application to microprocessor 50. Similarly, control signals developed by grinder control switch 14 are buffered by a conventional parallel-in serial-out data buffer 54.

Control signals generated by microprocessor 50 for the hopper selection solenoids 44 and 45 and the motor control relay 46 are applied to conventional optical isolators 55-58 through transistors 60-63. The outputs of the optical isolators are connected to respective ones of triacs 64-67, which control the application of AC line current to the controlled components.

A reset circuit 68 is provided in timer module 30 to reset the microprocessor upon initial power-up of the grinder, and a beeper circuit 70 is provided to alert the operator in the event of a malfunction. A conventional power supply 71 supplies operating power to the microprocessor and its associated circuits.

Figure 5A:
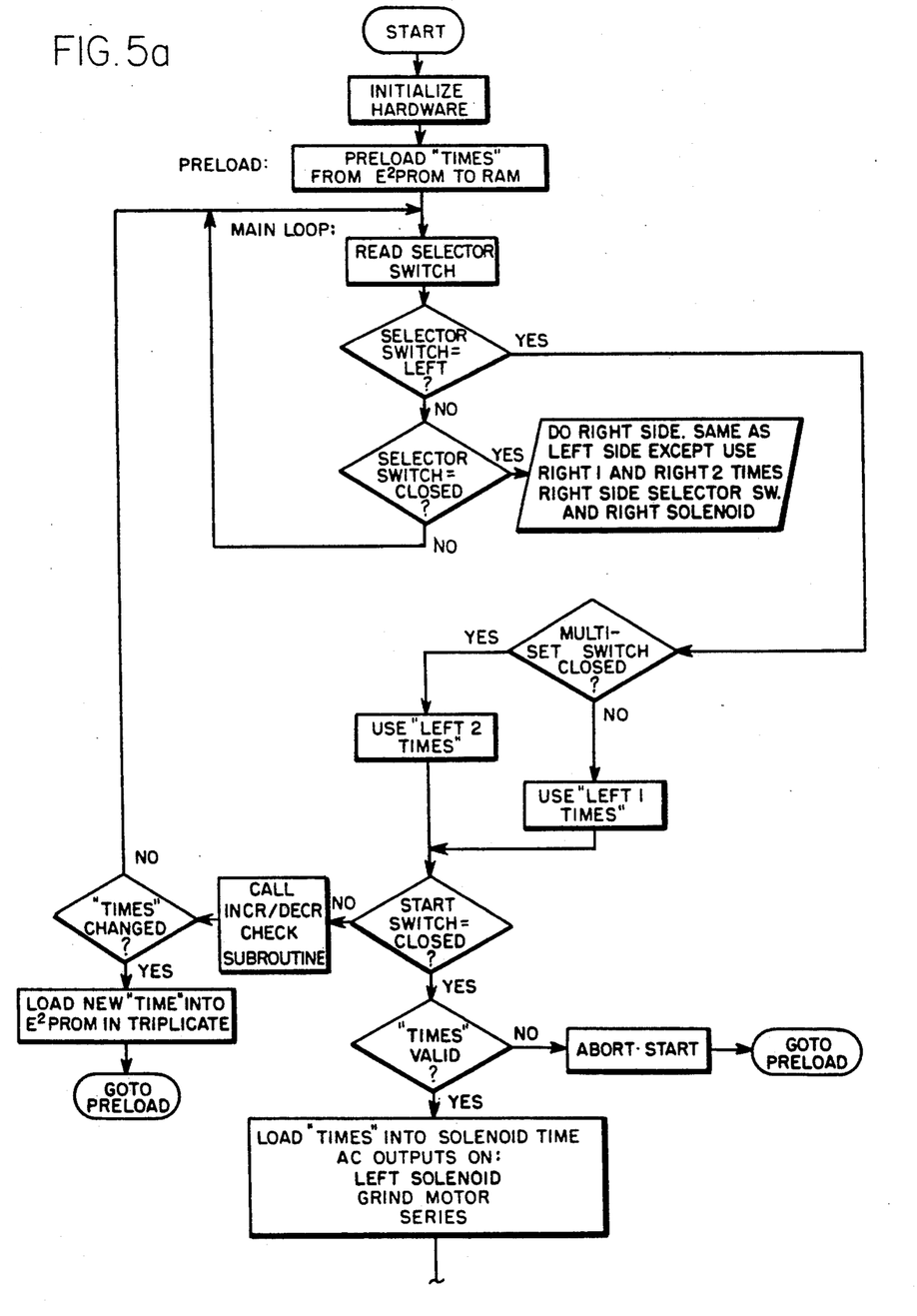
FIGS. 5a and 5b are a simplified logic flow chart useful in understanding the operation of the timer module.
Figure 5B:
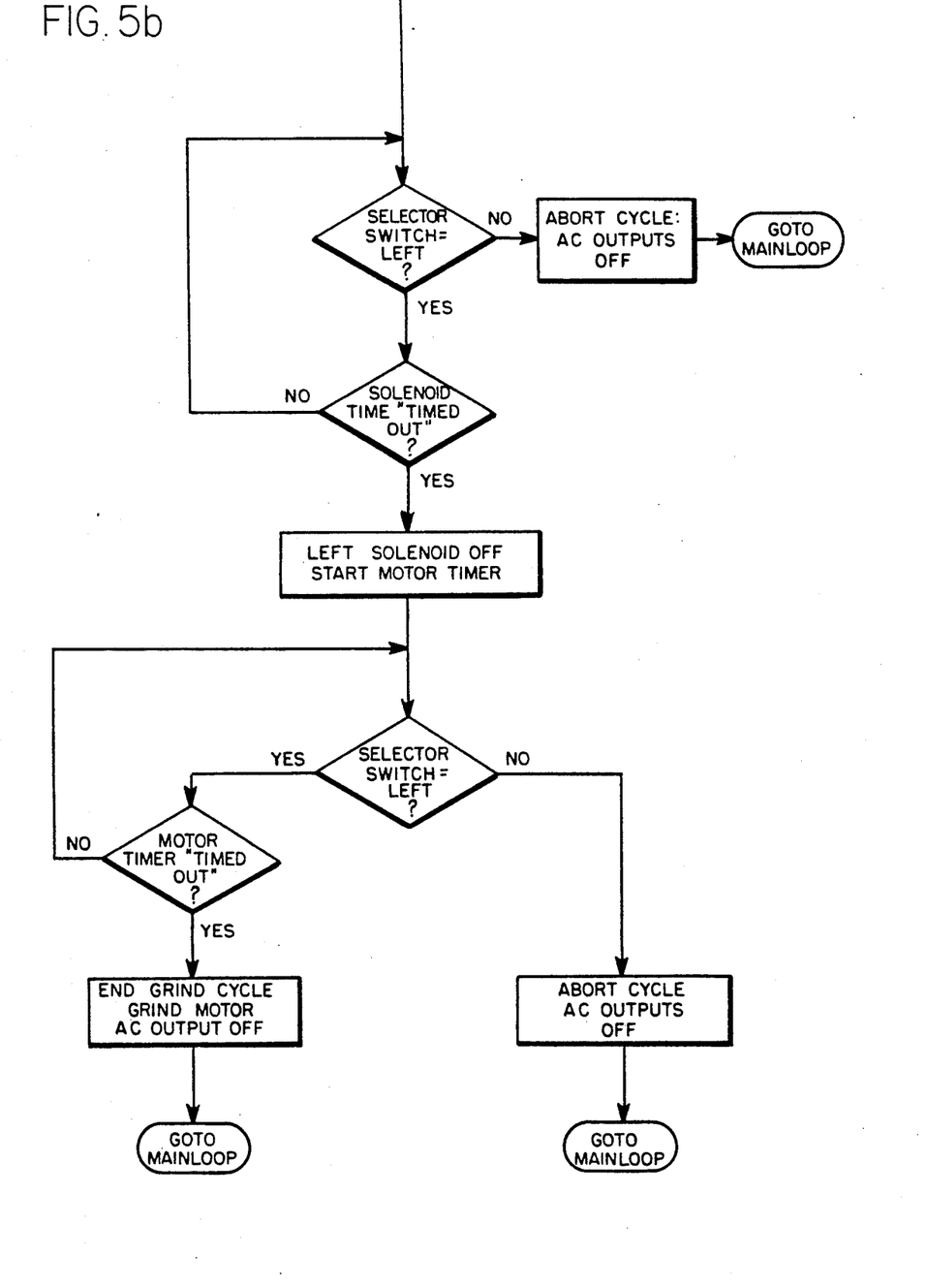

Referring to the simplified flow chart of FIGS. 5a and 5b, microprocessor 50 may be programmed by conventional techniques well known to those skilled in the art to respond to increase and decrease operator inputs to generate a reference counting state in a designated memory location in a serial-in serial-out EEPROM 72. Then, upon initiation of the grinder cycle, this count is transferred to a counter within microprocessor 50. The selected hopper is opened and the grinder motor runs as the counter is decremented downwardly by a clock circuit until its count reaches a predetermined minimum count, at which time the hopper is closed. The grinder motor is caused to continue to run for a fixed period of time by further counting action.

By reason of the ability of microprocessor 50 to accomplish designated algorithms, various timing factors may be introduced in computing the grind cycle and actuating the hopper selection solenoids and motor relay to compensate for small or large brews, or when accommodating a partial brew in an associated brewer.

Figure 6:
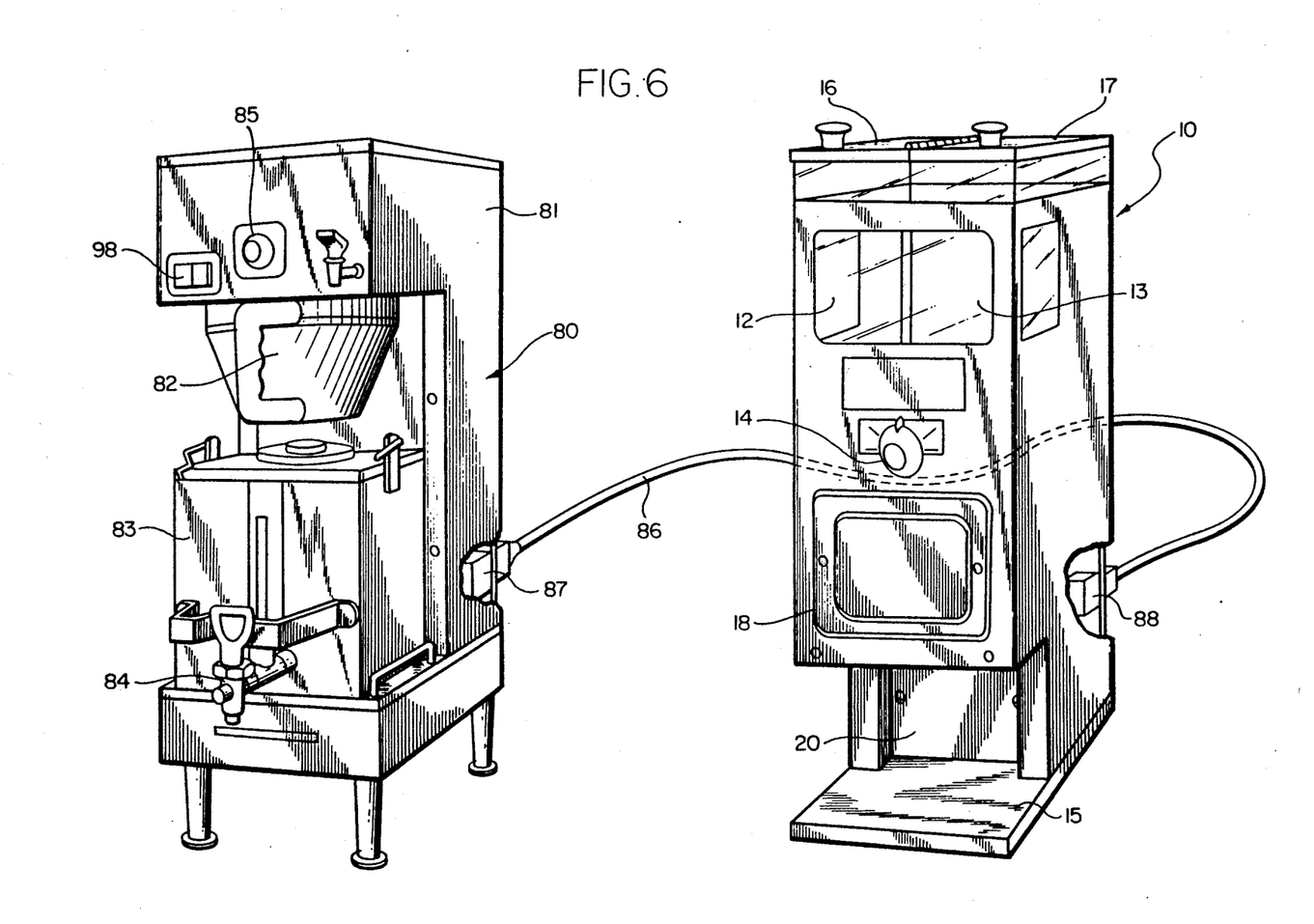
FIG. 6 is a perspective view of a brewing system comprising a grinder and a brewer incorporating a control system constructed in accordance with the invention.

Referring to FIG. 6, grinder 10 may be advantageously operated in functional association with a coffee brewer 80. Basically, brewer 80 includes a housing 81 which encloses a hot water reservoir (not shown), a brew funnel 82 for receiving hot water from the reservoir, and a container 83 for storing brewed coffee as the hot water passes through funnel 82. A pour spout 84 may be provided for dispensing coffee from reservoir 83.

To provide for convenient brewing of partial volumes, e.g., ½, ¾ of reservoir 83, brewer 80 includes, in accordance with another aspect of the invention, a brew volume select switch 85. So that a quantity of beans will be ground by grinder 10 which corresponds to the brew volume selected by switch 85, microprocessor 50 receives control signals from switch 85 through a cable 86 which extends between a connector 87 on the rear surface of the brewer housing and a connector 88 on the rear surface of the grinder housing. A second connector 89 (FIG. 7) may be provided on brewer 80 for connection to a second grinder.

Figure 7:
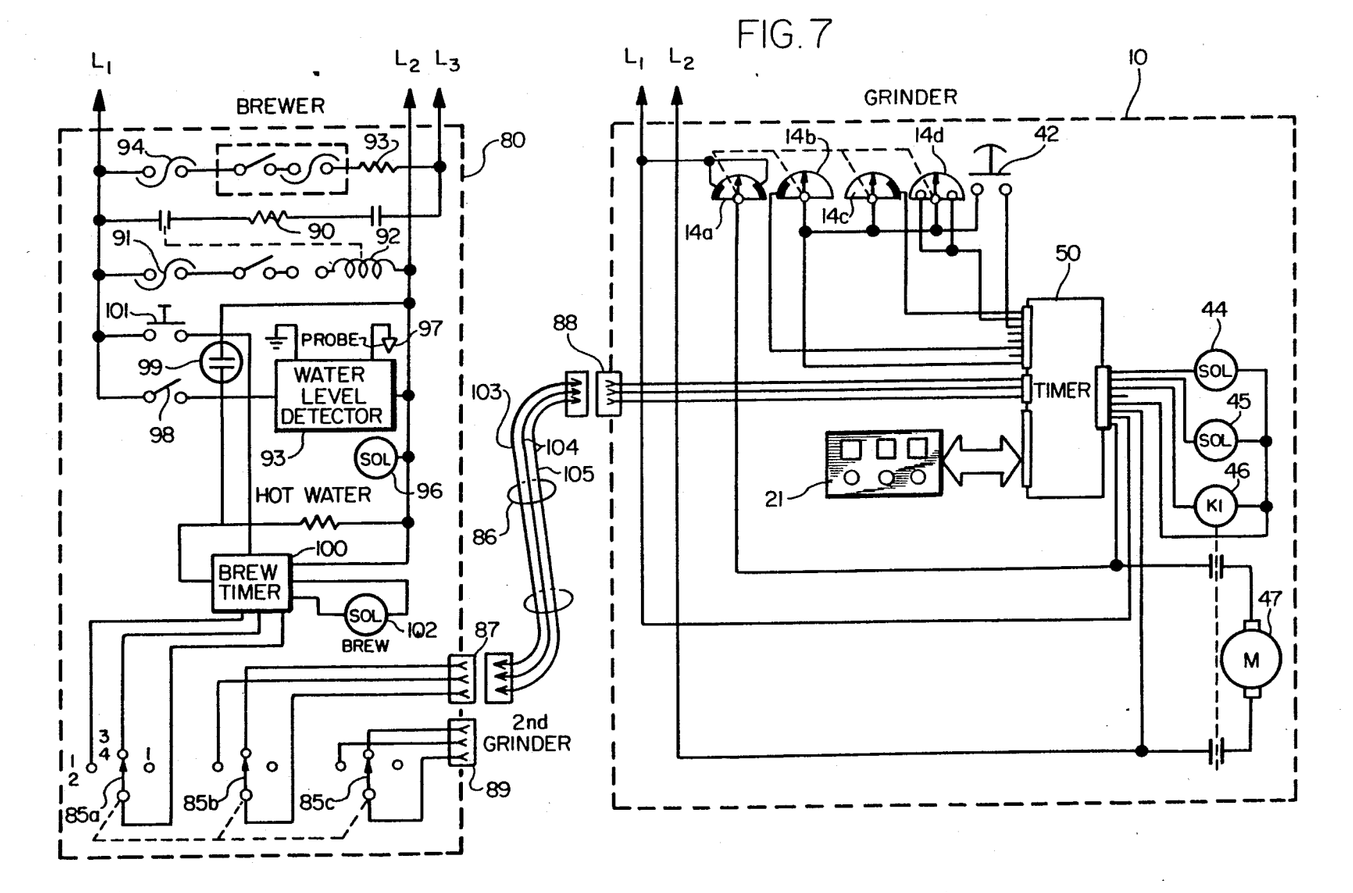
FIG. 7 is a simplified electrical schematic diagram of the brewing system shown in FIG. 6.

Basically, as shown in FIG. 7, brewer 80 includes a main resistance heating element 90 which is controlled by a thermostat 91 and relay 92 to maintain water in the hot water reservoir within a predetermined temperature range. A second auxiliary resistance heater 93 and thermostat 94 may be provided to provide hot water. A predetermined range of water levels is maintained in the hot water reservoir by a water level detector circuit 95, which opens a solenoid valve 96 to admit water to the reservoir when the water level falls below the level of a sensing probe 97 in the reservoir. A master switch 98 and indicator lamp 99 control and indicate the application of AC line current to the brewer control circuitry.

To brew coffee hot water is caused to flow from the hot water reservoir through brew funnel 82 to coffee reservoir 83. The duration of this flow, and hence the volume of coffee brewed, is controlled by a brew timer circuit 100. Initiation of a brew cycle occurs with momentary actuation of a switch 101, which may comprise a spring-loaded position of on-off switch 98. Timer 100 responds by opening a solenoid valve 102 which allows gravity flow from the hot water reservoir into the brew funnel To achieve partial brew quantities a first switch section 85a of selector switch 85 conditions timer 100 to open valve 102 for shorter time periods corresponding to selected partial brews In accordance with the invention, a second switch section 85b simultaneously conditions the grind cycle of grinder 10 through connecting cable 86. A third switch section 85c is provided in the event that it is desired to also condition a second grinder (not shown).

Cable 86 is provided with three conductors 103-105. When a full brew is selected by brew selector switch 85 none of the conductors is connected. When a ½ brew is selected, conductors 104 and 105 are connected. When a ¾ brew is selected, conductors 103 and 105 are connected. The particular connection results in selection by microprocessor 50 of an alternate memory location in EEPROM 72, and hence termination of the grind cycle after a different predetermined time interval.

To set-up the grind cycles for the partial brew selections it is only necessary to make the switch selection on the brewer and then with access panel 20 removed, actuate the increase and decrease switches 23 and 25 on panel 21 until the desired corresponding grind cycle duration in seconds is displayed on display 22. Thereafter, with actuation of control switch 14 to a start position the displayed grind cycle is accomplished. Switch 14 may be actuated at any time to cause the grind cycle to be displayed. The display is automatically extinguished after a fixed period of time following the actuation of any one of switches 23-25.

Thus, the grinder and brewer operate as a system, with the grinder automatically supplying a quantity of ground coffee beans appropriate to the brew volume selected by brew selector switch. Moreover, since the grind cycles are independently selected for each brew selection, the quantity of ground coffee beans for the partial brews need not be directly proportional to the selected portion, but can be adjusted to provide a stronger or weaker coffee product as desired.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. In combination with a coffee bean grinder having a bean grinding mechanism, an electric motor operably connected in driving relationship with said grinding mechanism, at least one bean hopper mounted in gravity feed relationship with said grinding mechanism, and gate means interposed between said hopper and said grinding mechanism and operable variably to connect said hopper in gravity feeding relationship with said grinding mechanism for measuring and dispensing different quantities of beans to the grinding mechanism, a coffee brewer operatively associated with said grinder and including a brewer control circuit providing multiple brewing modes and providing a control effect on said grinder indicative of a selected brewing mode, said control effect selecting a quantity of beans to be measured and ground by said grinder based on a selected volume of coffee to be brewed by said brewer, said grinder including a grinder control circuit comprising:

user-actuable switch means for entering a user-selected grinding mechanism cycle time;
   user-actuable grinder activation means;
   first digital storage means for storing a first user-selected grinding mechanism cycle time appropriate for one brewing mode entered by said switch means;
   second digital storage means for storing an alternate user-selected grinding mechanism cycle time appropriate for another brewing mode entered by said switch means;
   hopper control circuit means operable upon actuation of said activation means for opening the gate means for a selected one of said stored user-selected grinding mechanism cycle times;
   grinder motor control circuit means operable upon actuation of said activation means for operating the grinder motor for a grinder time cycle at least as long as said selected one of said stored user-selected grinding mechanism cycle times; and
   selection circuit means communicating with said grinder control circuit and responsive to said control effect provided by said brewer control circuit and rendering said hopper control circuit means and said grinder motor control circuit means responsive to said first digital storage means when the associated coffee brewer is in a first brewing mode, and responsive to said second digital storage means when the associated coffee brewer is in the second brewing mode.

2. The grinder control system as defined in claim 1 wherein said first and second digital storage means each comprises a non-volatile memory device.

3. The grinder control system as defined in claim 1 wherein the grinder includes an additional bean hopper and an additional gate means associated therewith, user-actuable switch means for selecting one of said hoppers for supplying beans to said grinding mechanism, and additional digital storage means for storing additional user-selected cycle times associated with said additional hopper, and wherein said hopper control circuit means and said grinder motor control circuit are responsive to said additional cycle times stored in said additional digital storage means upon user-selection of said additional paper.

* * * * *

UNITED STATES PATENT AND TRADEMARK OFFICE
CERTIFICATE OF CORRECTION

PATENT NO. : 5,186,399

DATED : February 16, 1993

INVENTOR(S) : John T. Knepler, Cloyce Newton and Kenneth W. Stover

It is certified that error appears in the above-identified patent and that said Letters Patent is hereby corrected as shown below:

Column 8, Line 27 " paper" should be -- hopper --

Signed and Sealed this

Fourth Day of January, 1994

BRUCE LEHMAN

*Attest:*

*Attesting Officer*  *Commissioner of Patents and Trademarks*